US011894977B1

(12) United States Patent
Revuri et al.

(10) Patent No.: US 11,894,977 B1
(45) Date of Patent: Feb. 6, 2024

(54) HARDWARE DRIFT DETERMINATION AND REMEDIATION

(71) Applicant: Dell Products L.P., Round Rock, TX (US)

(72) Inventors: Chandrasekhar Revuri, Bangalore (IN); Rishi Mukherjee, Bangalore (IN); Shivendra Katiyar, Bangalore (IN); Rekha Poosala, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/972,416

(22) Filed: Oct. 24, 2022

(51) Int. Cl.
*G06F 15/173* (2006.01)
*H04L 41/0866* (2022.01)
*H04L 41/082* (2022.01)

(52) U.S. Cl.
CPC ........ *H04L 41/0866* (2013.01); *H04L 41/082* (2013.01)

(58) Field of Classification Search
CPC .......................... H04L 41/0866; H04L 41/082
See application file for complete search history.

(56) References Cited

U.S. PATENT DOCUMENTS

| 7,702,655 B1* | 4/2010 | Panelli ................ H04L 67/1097 709/224 |
| 11,528,185 B1* | 12/2022 | Hrbek ................. H04L 41/0893 |
| 2003/0223104 A1* | 12/2003 | Kinoshita ........... H04J 14/0212 359/333 |
| 2020/0177444 A1* | 6/2020 | Nelson-Gal ............. H04L 67/56 |
| 2021/0044579 A1* | 2/2021 | Nelson-Gal ........... H04L 63/166 |
| 2023/0076734 A1* | 3/2023 | Ley ...................... H04N 19/186 |

FOREIGN PATENT DOCUMENTS

| CN | 102339227 A | * | 2/2012 | |
| WO | WO-03103193 A2 | * | 12/2003 | ............. H04B 10/27 |
| WO | WO-2012176311 A1 | * | 12/2012 | ............. G06F 11/006 |

* cited by examiner

*Primary Examiner* — Richard G Keehn
(74) *Attorney, Agent, or Firm* — Jackson Walker L.L.P.

(57) ABSTRACT

An information handling system may include at least one processor and a memory coupled to the at least one processor. The information handling system may be configured to: receive configuration data from a managed information handling system; receive compatibility data from a vendor of the managed information handling system; determine, based on the configuration data and the compatibility data, that the managed information handling system has drifted from a predetermined configuration; and based on the determination of drift, execute a responsive action with regard to the managed information handling system.

20 Claims, 3 Drawing Sheets

HARDWARE DRIFT DETERMINATION AND REMEDIATION

TECHNICAL FIELD

The present disclosure relates in general to information handling systems, and more particularly to detecting when an information handling system has drifted from a known system configuration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Customers often purchase information handling systems such as servers for various use cases or workloads (e.g., general-purpose or specific-purpose workloads) in the datacenter environment. The hardware requirements for such systems may vary based on the use case or workload running on a particular system.

In order to satisfy their workload requirements, customers sometimes later purchase and install third-party components, which may or may not be certified for use by the original vendor of the system. (For purposes of this disclosure, the term "vendor" also includes manufacturers, retailers, wholesalers, OEMs, etc. as appropriate.) For example, customers might purchase a new hard drive, solid state drive, memory, graphics processing unit, etc., and install it in the system without checking for compatibility or support. If the new component is not tested and/or not certified by the original vendor, then there is an increased probability of malfunction.

In general, the installation of such components contributes to a system's hardware drift relative to its original configuration. For purposes of this disclosure, the term "drift" may refer to differences of a system relative to any of (1) its original configuration, (2) the configuration of one or more peer systems, (3) an ideal configuration, (4) a supported configuration, or (5) any other known configuration.

Accordingly, embodiments of this disclosure allow for determination and remediation of such hardware drift.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with hardware drift in information handling systems may be reduced or eliminated.

In accordance with embodiments of the present disclosure, an information handling system may include at least one processor and a memory coupled to the at least one processor. The information handling system may be configured to: receive configuration data from a managed information handling system; receive compatibility data from a vendor of the managed information handling system; determine, based on the configuration data and the compatibility data, that the managed information handling system has drifted from a predetermined configuration; and based on the determination of drift, execute a responsive action with regard to the managed information handling system.

In accordance with these and other embodiments of the present disclosure, a method may include an information handling system receiving configuration data from a managed information handling system; the information handling system receiving compatibility data from a vendor of the managed information handling system; the information handling system determining, based on the configuration data and the compatibility data, that the managed information handling system has drifted from a predetermined configuration; and based on the determination of drift, the information handling system executing a responsive action with regard to the managed information handling system.

In accordance with these and other embodiments of the present disclosure, an article of manufacture may include a non-transitory, computer-readable medium having computer-executable code thereon that is executable by an information handling system for: receiving configuration data from a managed information handling system; receiving compatibility data from a vendor of the managed information handling system; determining, based on the configuration data and the compatibility data, that the managed information handling system has drifted from a predetermined configuration; and based on the determination of drift, executing a responsive action with regard to the managed information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
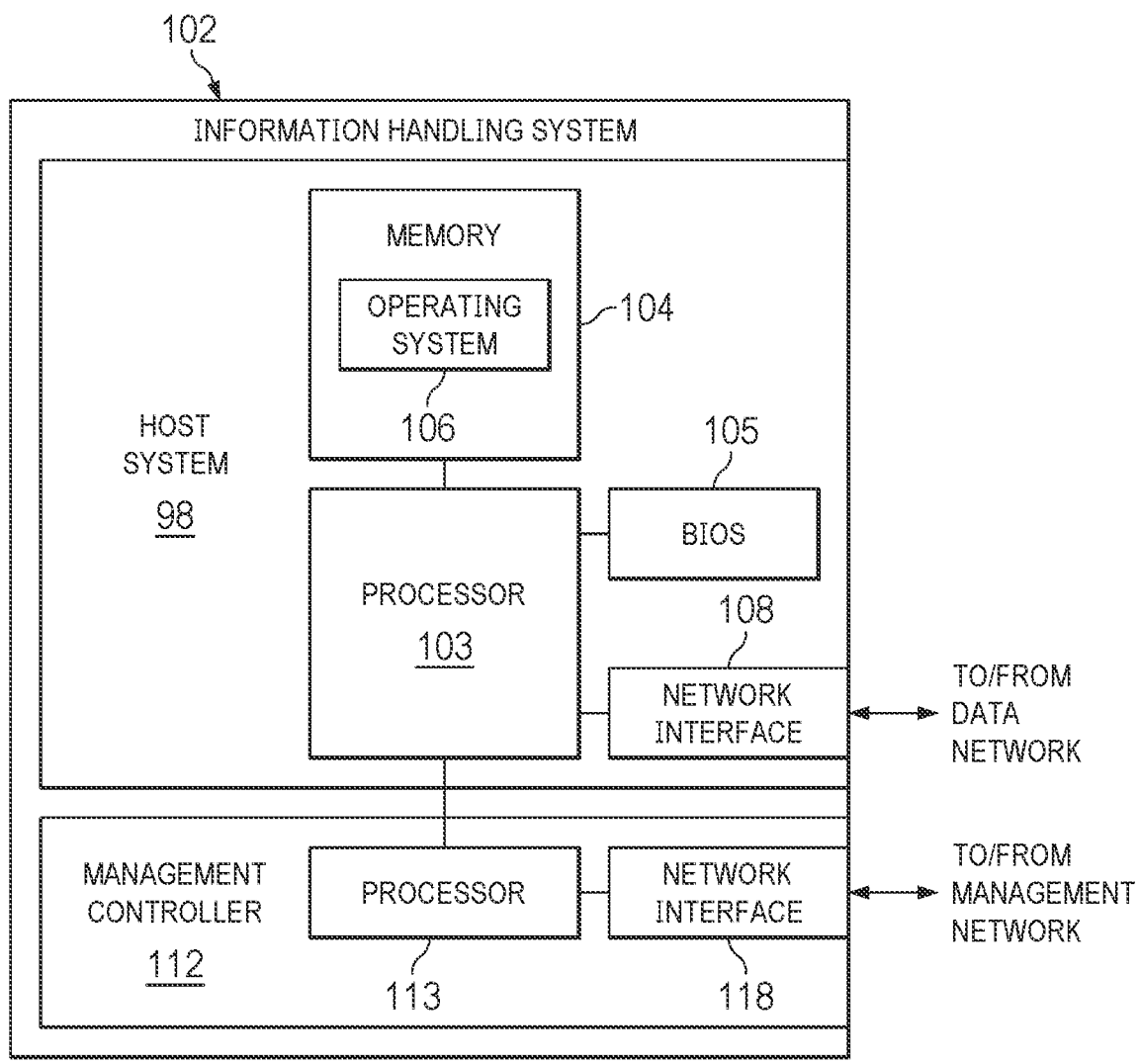
FIG. 1 illustrates a block diagram of an example information handling system, in accordance with embodiments of the present disclosure.
Figure 2:
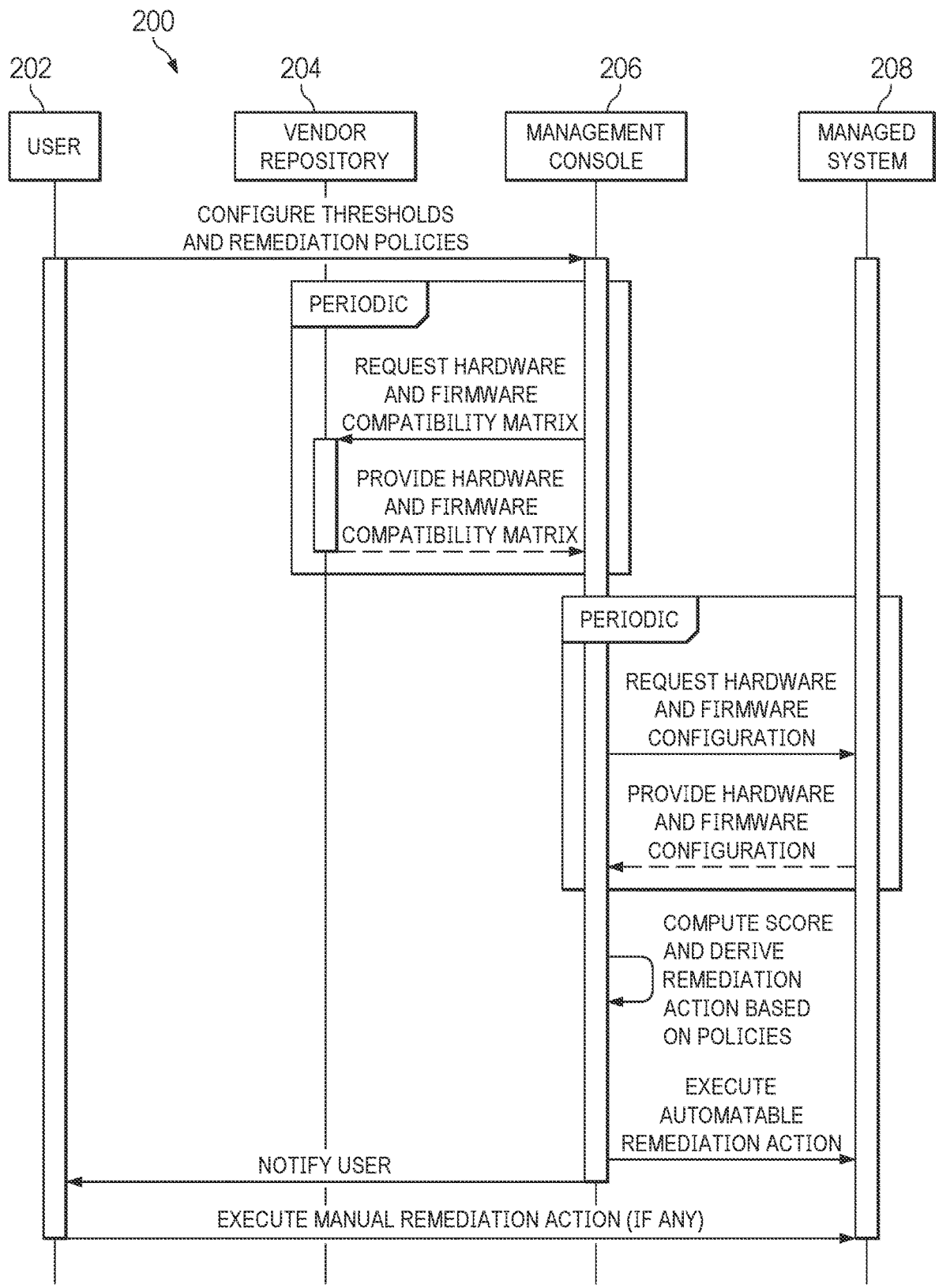
FIG. 2 illustrates an example method, in accordance with embodiments of the present disclosure.
Figure 3:
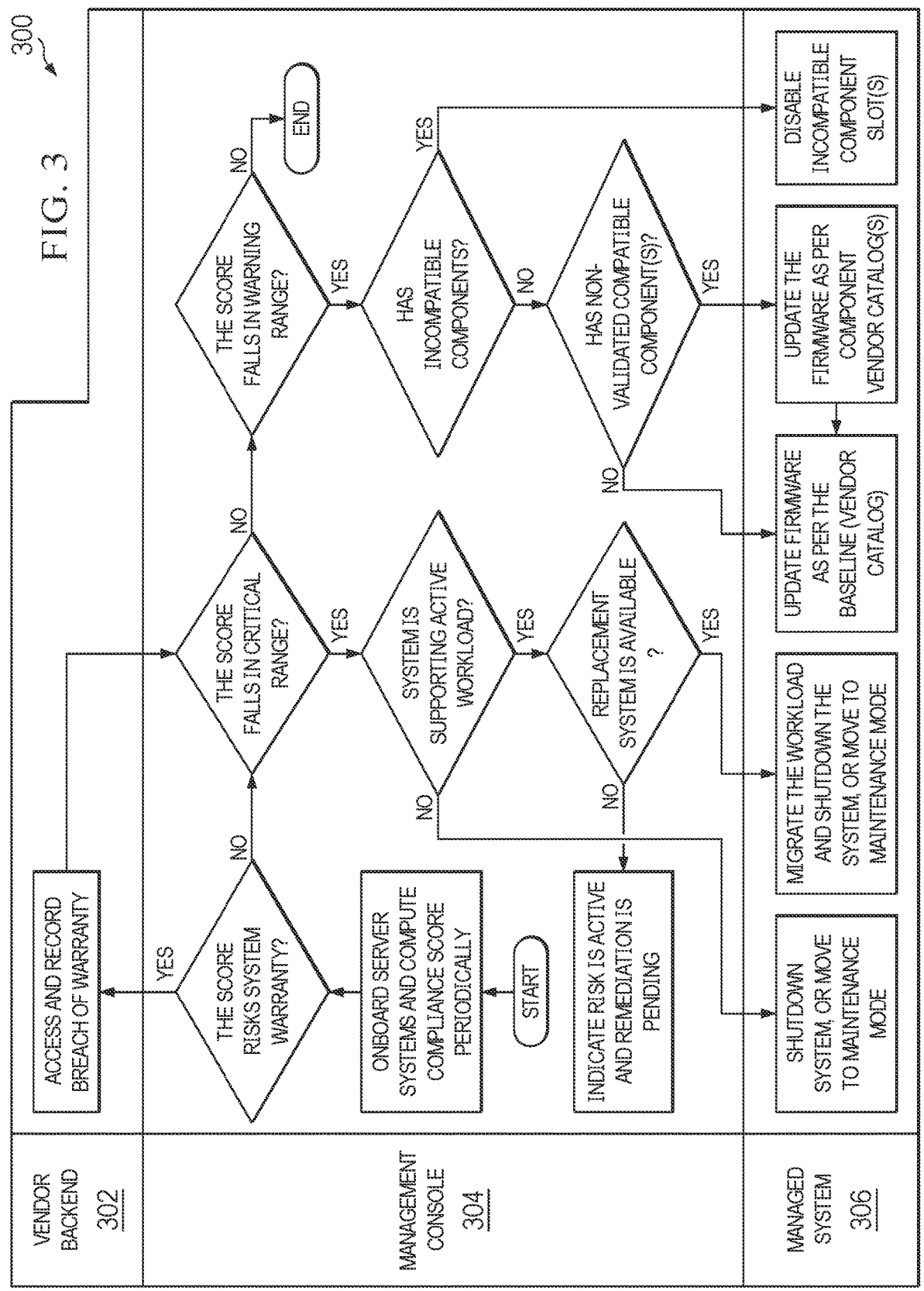
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be advantageous to be able to detect when information handling system 102 has drifted from a known configuration (e.g., through the unsupported addition of some new information handling resource).

Accordingly, embodiments of this disclosure may use a "compliance score" to measure hardware drift, and may also provide remediation options based on the compliance score. A compliance score may be calculated dynamically as system hardware changes, and if the score falls below a threshold, one or more responsive actions may be taken.

Such responsive actions may include notifying a user (e.g., an administrator), suggesting a remedial action, automatically taking a remedial action, etc. In some embodiments, the remedial actions may include actions such as shutting down the system, transitioning the system to a maintenance mode, migrating workloads such as virtual machines off of the system and then transitioning the system to a maintenance mode, updating a firmware to a compatible version, disabling a component, disabling a slot or connector, etc.

The system compliance score may be computed based on incompatible or un-validated hardware, incompatible or un-validated firmware, incompatible or un-validated software, configuration settings, and/or any other data that may be indicative of drift. For example, an incompatible component is one which is known to malfunction in a given system or configuration; an un-validated component is one which may or may not function correctly, but which the vendor has not verified to function correctly. For the sake of clarity and exposition, an example implementation is discussed below in which the system compliance score is based on hardware and firmware, but one of ordinary skill in the art with the benefit of this disclosure will appreciate that other implementations are also possible.

In one implementation, the system compliance score may range from 0 to 100. When a customer initially purchases a system, the system compliance score may be 100 because no alterations have yet taken place. In one implementation, the total system compliance score may be distributed among the various factors which determine the compliance level, as discussed in more detail below.

In order to compute the system compliance score, the system inventory may be collected periodically or at desired times. For example, a management controller may be accessed on every restart of the system or based on a schedule. In these and other embodiments, a change in hardware components (e.g., an addition or a removal), a configuration change, or a firmware update/downgrade, etc. may trigger a re-computation of the system compliance score.

Firmware versions that are present in the system may be compared with validated firmware versions in a vendor catalog which may be published online to determine the firmware compatibility portion of the system compliance score, as discussed in more detail below.

The hardware compatibility score may be computed based on a catalog of supported and/or validated components. The list of such components may also be published online and may be refreshed by the vendor periodically as new components gain support, and the hardware present in the system may be compared with the entries in that catalog. In general, the catalog may provide a matrix of hardware/software/firmware compatibility with regard to any given system. For example, the catalog may indicate validated components that are validated to work with a system, as well as incompatible components that are known not to work with the system; an inference may then be drawn that any other components are to be considered un-validated.

Once the firmware and hardware compatibility scores are computed, their contributions to the overall system compliance score may be calculated as discussed in more detail below.

In one embodiment, a threshold level may be configured such that any system compliance score falling below the threshold triggers a configurable policy action. For example, a compliance score of 100 may be considered healthy, a score between 90 and 100 may be considered a warning, and a score below 90 may be considered critical. In some embodiments, the score threshold levels and associated actions may be configurable by a user.

The following section discusses an example of a system compliance score that may be based on a sum of sub-scores from multiple priority classes (e.g., high priority=3, medium priority=2, and low priority=1). Other frameworks for calculation of the compliance score are also possible in particular implementations, as one of ordinary skill with the benefit of this disclosure will appreciate.

In this example, the presence of an incompatible hardware component may be high priority, the presence of an un-validated hardware component may be medium priority, the presence of an incompatible firmware may have a priority that depends on importance of the firmware.

For example, the contribution $T(P_C)$ from a given priority class $P_C$ may be computed as follows, where the index i refers to the different components within class $P_C$:

$$T(P_C) = (T * P_i * W_i) / \sum_{i=1}^{N} (P_i * w_i)$$

where $T(P_C)$=Compliance score within priority class $P_C$
T=Total compliance score of the system (e.g., 100 for a healthy system)
$P_i$=Number of factors in each priority class
$W_i$=Priority weight
N=Number of priority classes As one example of compliance score computation, priority classes may be set as follows:
High=3 (Range 65-100)
Medium=2 (Range 30-64)
Low=1 (Range 1-29)

To determine the priority of an event, the Proportional Weight of the Factors and Proportional Event Weight may be calculated. The Weight values may then be used to determine the amount of influence that the following priorities have on calculating the actual priority of the event. The calculation may proceed based on the following:

IncidentPriority: The priority of the object that is raising the event.

EventPriority: The priority of the type of the event.

ProportionalFactorWeight=FactorWeight/(FactorWeight+EventWeight)

ProportionalEventWeight=EventWeight/(FactorWeight+EventWeight)

ActualEventPriority=
(IncidentPriority*ProportionalFactorWeight)+
(EventPriority*ProportionalEventWeight)

Based on a runtime evaluation of the ActualEventPriority, weighted priorities of the factor may then be re-calibrated with respect to the applicable ranges noted above.

The following example uses the following Weight values:
FactorWeight=75
EventWeight=25

These Weight values produce the following Proportional Weight values:
ProportionalFactorWeight=75/(75+25)
=75/100
=0.75
ProportionalEventWeight=25/(75+25)
=25/100
=0.25

Thus consider the calculation of an ActualEventPriority for an event that was raised by a Factor with an IncidentPriority of 70, in which the EventPriority is 50:
ActualEventPriority=(70*0.75)+(50*0.25)
=52.5+12.5
=65

As one of ordinary skill in the art with the benefit of this disclosure will appreciate, various other frameworks for determining priorities, weightings, etc. may also be used in particular implementations.

Turning now to FIG. 2, a flow chart is shown of an example method 200. Method 200 is depicted as a sequence diagram involving user 202 (e.g., an administrator), vendor repository 204 (e.g., supplying a catalog as discussed above), management console 206, and managed system 208.

As shown, user 202 may configure various thresholds and remediation policies via management console 206 as discussed above. Management console 206 may periodically retrieve updates to the compatibility matrix from the vendor catalog stored at vendor repository 204, as well as retrieving information about the current configuration of managed system 208. Management console 206 may then periodically determine the compliance score of managed system 208. If the compliance score ever falls below any thresholds set by user 202, management console 206 may take automated remedial action and/or notify user 202, who may also take manual remedial action.

Turning now to FIG. 3, a flow chart is shown of an example method 300. Method 300 is depicted as a sequence diagram involving vendor backend 302, management console 304, and managed system 306. As shown, management console may periodically calculate the compliance scores of its managed systems 306, notifying vendor backend 302 of possible warranty issues, and conducting various remedial actions based on the type and severity of any issues detected.

One of ordinary skill in the art with the benefit of this disclosure will understand that the preferred initialization point for the methods depicted in FIGS. 2 and 3 and the order of the steps comprising those methods may depend on the implementation chosen. In these and other embodiments, the methods may be implemented as hardware, firmware, software, applications, functions, libraries, or other instructions. Further, although FIGS. 2 and 3 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Accordingly, embodiments of this disclosure may provide many benefits. The use of a quantitative scoring mechanism provides a measurable way of determining drift, and remedial actions may be based on the quantitative value of the score. Customers may have the flexibility to change the compliance score threshold(s) based on their own compliance policies and preferences. Customers may have the ability to monitor any incompatible components, and they may also decide on the degree of future usage of a system based on its compliance score if remediation is infeasible. For example, a system that has a low compliance score might be tasked with non-critical duties, etc. Further, the techniques herein may also allow a vendor to determine violations to the system warranty agreement.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory coupled to the at least one processor;
   wherein the information handling system is configured to:
   receive configuration data from a managed information handling system;
   receive compatibility data from a vendor of the managed information handling system;
   calculate a compliance score for the managed information handling system based on the configuration data and the compatibility data, wherein the compliance score is a number that is based on incompatible and/or un-validated components of the managed information handling system;
   determine, based on the compliance score being beyond a threshold compliance score, that the managed information handling system has drifted from a predetermined configuration, wherein the drift comprises a difference in one or more hardware components; and
   based on the determination of drift, execute a responsive action with regard to the managed information handling system.

2. The information handling system of claim 1, wherein the responsive action comprises notifying an administrator.

3. The information handling system of claim 1, wherein the responsive action comprises automatically executing a remedial action.

4. The information handling system of claim 3, wherein the remedial action comprises disabling an information handling resource of the managed information handling system.

5. The information handling system of claim 1, wherein the drift further comprises a difference in firmware version.

6. The information handling system of claim 1, wherein the predetermined configuration is an original configuration of the managed information handling system.

7. The information handling system of claim 1, further configured to recalculate the compliance score in response to a change in hardware of the managed information handling system, a change in configuration of the managed information handling system, or a change in firmware of the managed information handling system.

8. A method comprising:
   an information handling system receiving configuration data from a managed information handling system;
   the information handling system receiving compatibility data from a vendor of the managed information handling system;
   the information handling system calculating a compliance score for the managed information handling system based on the configuration data and the compatibility data, wherein the compliance score is a number that is based on incompatible and/or un-validated components of the managed information handling system;
   the information handling system determining, based on the compliance score being beyond a threshold compliance score, that the managed information handling system has drifted from a predetermined configuration, wherein the drift comprises a difference in one or more hardware components; and
   based on the determination of drift, the information handling system executing a responsive action with regard to the managed information handling system.

9. The method of claim 8, wherein the responsive action comprises notifying an administrator.

10. The method of claim 8, wherein the responsive action comprises automatically executing a remedial action.

11. The method of claim 10, wherein the remedial action comprises disabling an information handling resource of the managed information handling system.

12. The method of claim 8, wherein the drift further comprises a difference in firmware version.

13. The method of claim 8, further comprising recalculating the compliance score in response to a change in hardware of the managed information handling system, a change in configuration of the managed information handling system, or a change in firmware of the managed information handling system.

14. An article of manufacture comprising a non-transitory, computer-readable medium having computer-executable code thereon that is executable by an information handling system for:
   receiving configuration data from a managed information handling system;
   receiving compatibility data from a vendor of the managed information handling system;
   calculating a compliance score for the managed information handling system based on the configuration data and the compatibility data, wherein the compliance score is a number that is based on incompatible and/or un-validated components of the managed information handling system;
   determining, based on the compliance score being beyond a threshold compliance score, that the managed information handling system has drifted from a predetermined configuration, wherein the drift comprises a difference in one or more hardware components; and
   based on the determination of drift, executing a responsive action with regard to the managed information handling system.

15. The article of claim 14, wherein the responsive action comprises notifying an administrator.

16. The article of claim 14, wherein the responsive action comprises automatically executing a remedial action.

17. The article of claim 16, wherein the remedial action comprises disabling an information handling resource of the managed information handling system.

18. The article of claim 14, wherein the drift further comprises a difference in firmware version.

19. The article of claim 14, wherein the predetermined configuration is an original configuration of the managed information handling system.

20. The article of claim 14, wherein the information handling system is further configured to recalculate the compliance score in response to a change in hardware of the managed information handling system, a change in configuration of the managed information handling system, or a change in firmware of the managed information handling system.

* * * * *